3,285,357
AIR CUSHION VEHICLES WITH MANEUVERING AND FORWARD PROPULSION CONTROLS
Melville W. Beardsley, Severna Park, Md., assignor, by mesne assignments, to A. Fred Starobin, Washington, D.C.
Filed Sept. 29, 1960, Ser. No. 59,348
4 Claims. (Cl. 180—7)

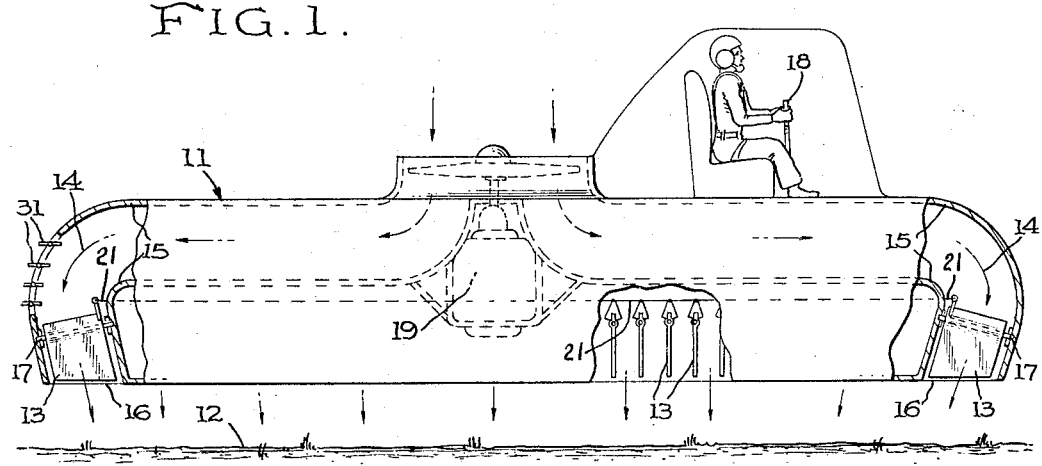

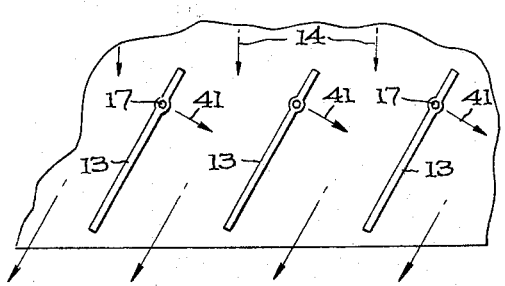
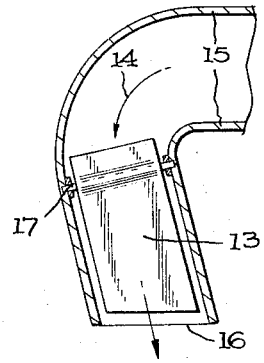
FIG. 4A.  FIG. 4B.
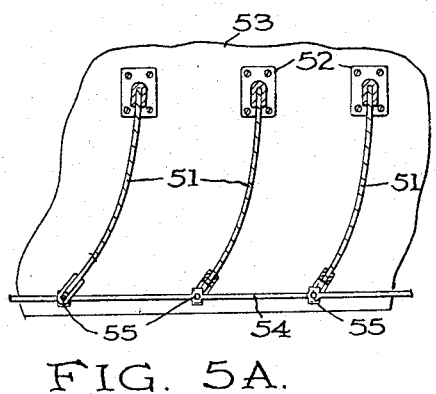
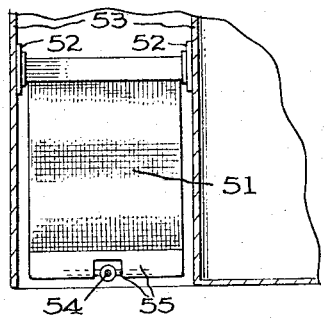
FIG. 5A.  FIG. 5B.
FIG. 6.
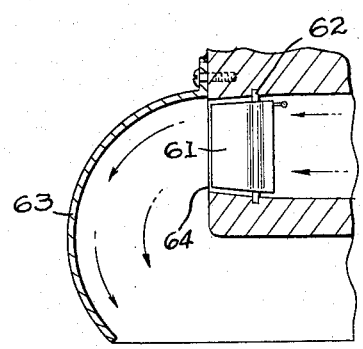
INVENTOR
MELVILLE W. BEARDSLEY
BY *A. Fred Starobin*
ATTORNEY United States Patent Office 3,285,357
Patented Nov. 15, 1966

The present invention relates to a control means adapted to provide control of the motion of air cushion vehicles.

In my co-pending application, Serial No. 650,583 filed April 4, 1957, there is described a type of ground effect vehicle supported by a cushion of air in such a manner that the vehicle has no physical contact with the ground or water surface over which it operates. This type of vehicle is variously called, "Air Cushion Vehicle," "Ground Effect Machine," "Airborne Surface Vehicle," "Minimum Ground Pressure Vehicle" or "Free Air Suspension System."

In order to enable the proper utilization of vehicles of this type it is necessary that they incorporate means for propulsion and control so that they can be operated along a controlled path. Since there is no ground contact, automotive type controls relying on horizontal frictional forces applied to the machine by the ground surface cannot be used. Exterior control surfaces, such as are employed in aircraft, are not adequate, since control and maneuvering are required at speeds to slow to develop effective aerodynamic forces on such control surfaces.

Control and propulsion for ground effect machines has been provided by such means as steerable auxiliary engine propeller combinations or by "bleeding off" air from the main blowing system and ejecting it horizontally through controllable ports to provide horizontal propulsion and maneuvering forces. Such means usually require additional power and greatly increase the complexity and cost of the vehicle.

Accordingly, the present invention is directed to an improved means of providing control for maneuvering and forward propulsion.

Basically the present invention is comprised of means for deflecting the main air flow which provides the lifting forces for the air cushion vehicle. By these means the main air flow accomplishes a dual function of supporting the vehicle and at the same time providing horizontal control and propulsion forces. In this way the total installed power is minimized and effective control is realized with minimum weight and cost.

Therefore, it is the object of this invention to provide a means of maneuvering and control of air cushion vehicles in the most efficient manner. These means should enable the turning of the vehicles and also include means for allowing for the backward movement of this vehicle.

Furthermore, it is an object of this invention to provide a simple control system operable by a person without the necessity for specialized training.

The above and other objects and advantages of the invention will become apparent upon full consideration of the following detailed description and accompanying drawings, in which:

FIG. 1 is an elevation view of an air cushion vehicle with certain sections cut away for a better internal view of the vehicle;

FIG. 2 is a bottom surface view of an air cushion vehicle showing an arrangement of ducting and control vanes that may be used to incorporate the principles of this invention;

FIG. 3 is an example of a method of connecting the controls in an air cushion vehicle;

FIGS. 4A and 4B are profile view and view in a plane perpendicular to jet sheet air flow respectively of one embodiment of the vanes used to control an air cushion vehicle;

FIGS. 5A and 5B are the same views of a second embodiment of a type of vane used to control these vehicles; and FIG. 6 discloses still another embodiment wherein the vanes rotate on a vertical axis as shown in a sectional view.

The general embodiment of the present invention as it may be used in an air cushion vehicle is illustrated in FIG. 1, which shows an air cushion vehicle 11 with controls set for hovering over a surface 12 which may be either a ground or water surface. Cutaway views of typical sections of the front, rear and side of the vehicle show control vanes 13 located in the air flow, generated by the fan blade operated by engine 19 and indicated by arrows 14, passing through the ducting 15 in a position adjacent to the discharge slot area 16. This discharge slot area 16 extends completely around the periphery of the vehicle 11. The control vanes 13 may also be spaced completely around the periphery or may be grouped in two or more areas around the periphery.

FIG. 2, which shows a bottom view of one type of air cushion vehicle, also discloses a possible grouping of vanes 13 so as to minimize the amount of controls necessary to move these vanes 13 when spaced completely around the periphery of the vehicle. This is an example of only one embodiment and, as stated above, there are many other possible groupings for control vanes 13 in order to effect the control of an air cushion vehicle.

FIG. 3 shows one way in which the movement of vanes 13 may be controlled. The control vanes 13 are actuated to turn on horizontal axis 17 through a suitable system of linkages or cables by movement of control column 18 by the operator. For the purposes of simplicity, only two control vanes 13 are shown in this figure, since other adjacent vanes on the same side would have the same movement. As can be seen by referring to FIG. 3, the control vanes 13 are rotated about their axis of rotation 17 by movement of connected control cables 21 which are, in turn, connected to the cross arm 22 of the operator's controls column 18 through a suitable arrangement of pulleys 23. In this illustrative example the control column 18 is mounted on a hinged fitting 24 allowing fore and aft movement of the control column 18. The bottom end of the control column 18 has a tube 26 hinged to the fitting 24 and extending up into the uper part of control column 18 in a manner so that the upper part of control column 18 can be rotated about it.

With such an arrangement a forward movement of the uper end of the control column 18 rotates the vanes 13 on both sides with the same direction of rotation; i.e., when the upper control column 18 is moved forward the ends of the vanes 13 located above their axis of rotation 17 are moved forward. By this arrangement the vehicle is provided with fore and aft movement.

In addition, when the control yoke 27 is rotated in an essentially horizontal plane, the vanes 13 are rotated about axis 17 in opposite directions. For example, when the left yoke handle 28 is moved forward, end 32 of cross arm 22 moves forward causing a forward movement of the top of control vanes 13 on the port side of vehicle 11. Since end 33 of cross arm 22 moves rearward, it similarly causes rotation of control vanes 13 on the starboard side of vehicle 11 such that the end of the vane located above its axis of rotation 17 moves rearward. In this way a differential movement of the control vanes 13 is accomplished to apply turning forces to the vehicle.

The control yoke 27 is shown for simplicity although it should be understood that this yoke may be replaced by some other form of control actuating form, such as a wheel placed in a horizontal, vertical or other plane of motion. For a plane of motion other than horizontal a simple linkage or cable system can be employed to cause the type of movements of vanes 13 described above.

With this simple control arrangement, the operator causes the vehicle to go forward by pushing forward on his control yoke or wheel. He causes the vehicle to turn independently or in conjunction with the fore or aft movement by rotating his yoke or wheel. The arrangement as illustrated in the example of FIG. 3 is such that a counterclockwise turning of control yoke 27 causes the vehicle to turn to the left, and a clockwise turning of yoke 27 causes turning of the vehicle to the right.

It has been determined by analysis that propulsion for forward movement of air cushion vehicles is most efficiently provided by means of rearward deflection of the jet sheet air flow which provides the vehicle support. This situation exists because there is no momentum drag as the dynamic pressure due to the vehicle's forward motion is efficiently employed, since it provides the extra rearward component to the jet sheet velocity.

Forward motion of the air cushion vehicle may be supplemented through the use of slats 31 located in the rear of vehicle 11, as shown in FIG 1. Although the slats are shown in an open position for illustrative purposes in the figure, for the best performance, slats 31 will remain closed until vanes 13 have reached a position beyond which further movement of the lower ends toward the rear of the vehicle would decrease the lifting power of the vehicle due to closure of the spaces between vanes 13. At this point in the movement of the vanes 13 the slats 31 would be connected so as to automatically open and due to the discharge of the air through these open slats 31 in cooperation with the discharge air flow through the deflecting vanes 13, the vehicle may attain the desired forward speed. Any of several means of operating the slats 31 may be used, such as control systems similar to those used to operate ailerons or elevators on aircraft. One such type of cable control system, is illustrated in FIG. 5 of the Ross Patent No. 2,736,514 issued February 28, 1956. Controllable slats of this type may also be placed in other positions on the vehicle if desired so that the vehicle could develop higher speeds for sideward or backward motion.

The control system illustrated and described operates on the basis of applying horizontal forces to control vanes as a reaction to their deflection of the jet sheet discharged from the vehicle. These horizontal forces are in the plane of flow of the jet sheet, as illustrated in FIGS. 4A and 4B. FIG. 4A shows a profile view of control vanes 13 in the plane of the air flow just prior to the ejection of the air flow from the jet discharge area 16. FIG. 4B indicates a view in a plane perpendicular to the plane of a jet sheet showing the placement of the vanes in relation to the surfaces of the ducting 15 which conducts the air from a blower to the discharge area 16. As shown in FIG. 4A, the air flow in the ducting 15, represented by arrows 14, is deflected by the vanes 13 so that it has a horizontal component of flow as it is ejected through the discharge area 16. This deflection of the flow causes a reaction force, represented by vectors 41, on vanes 13. The horizontal component of this reaction force is employed for maneuvering and propelling the air cushion vehicle 11.

The flow discharge from the air cushion vehicle 11 may be utilized still more efficiently if the control vanes are flexible so that when deflected they provide a more efficient passageway for the air flow between them. This type of control vane is illustrated in FIGS. 5A and 5B showing the control vane 51 comprising a thin flexible material mounted at its upper end by a fitting 52 attached to the surface of the ducting 53. The bottom or trailing of the flexible control vane 51 has a control cable 54 connected to it by a hinged connection 55 the cable or rod 54 provides movement to give the desired angle of deflection. The example shown in FIG. 5 is only one possible embodiment and it should be understood that other flexible vane arrangements may be employed to give the desired results.

In FIG. 6 there is shown another embodiment of this type of control system. Here the air discharge passes between vanes 61 rotating on a vertical axis 62 instead of a horizontal axis as previously shown, out through air discharge nozzle 64. A rounded skirt 63 then deflects the air flow downward toward the surface over which the vehicle is traveling. With the operator's controls and cable system similar to that illustrated in FIG. 3, this type of vane control system may also be used for maneuvering and propelling an air cushion vehicle.

Although the air flow is shown as being conducted by ducting in the embodiments of the invention described and illustrated above, it is to be realized that this invention is also applicable in the case of air cushion vehicles which have no inner ducting surface, such as in the case where the air flow adheres to the curved inner surface of the outer shell as illustrated in my application, Serial No. 26,165 filed May 2, 1960, and entitled "Airborne Surface Vehicle," and since issued as Patent No. 3,039,550. In such case the vanes are attached only to the inside surface of the outer shell of the vehicle. The strength of such an attachment is increased in order to compensate for support that would ordinarily be furnished by the inner wall of ducting in vehicles having such construction and described in the embodiments illustrated.

It should be understood that the specific embodiments of the apparatus herein illustrated and described are intended to be representative only, as many changes may be made therein without departing from the clear teachings of the invention. Accordingly, reference should be made to the following claims in determining the full scope of the invention.

What is claimed is:

1. Controls for an air cushion vehicle of the type having a hollow body and a peripheral nozzle on the lower side of said body with an air flow emitted from said nozzle comprising
   a plurality of longitudinally spaced vanes positioned in and disposed widthwise of said nozzle, each vane being of a rigid material but having sufficient flexibility to be bent to form a surface of constant uniform curvature located in the path of the air emitted from the peripheral nozzle with the entire surface of each vane tangent to said path of air flow adjacent said surface,
   each of said vanes having an upper portion rigidly fixed to said vehicle and a movable lower portion,
   control means attached to said lower portion of said plurality of said vanes,
   whereby movement of said control means simultaneously changes the curvature of each of said vanes in said plurality of vanes.

2. The controls of claim 1 further characterized by an opening in said body, in addition to said nozzle,
   movable means positioned in said opening and controlling said opening, thereby effecting communication between the interior of said body and the surrounding atmosphere,
   said movable means when assuming an open position allowing the passage of air therethrough, said vanes through movement of said control means assuming a position so as to direct the air flow at the peripheral nozzle in a rearward direction.

3. The controls of claim 2, further characterized by said movable means comprising slats positioned in said opening.

4. Controls for an air cushion vehicle of the type having a body with a hollow portion and a peripheral nozzle portion on the lower side of said body with an air flow emitted from said nozzle portion comprising
   a plurality of longitudinally spaced vanes positioned in and disposed widthwise of said nozzle portion, each vane being of a rigid material but having sufficient flexibility to be bent to form a surface of smooth uniform curvature located in the path of the air emitted from the peripheral nozzle portion with the entire surface of each vane tangent to said path of air flow adjacent said surface, each of said vanes having an upper edge portion rigidly fixed to said vehicle and a freely movable lower portion, control means attached to said freely movable lower portion of said plurality of said vanes, whereby movement of said control means simultaneously changes the curvature of each of said vanes in said plurality of vanes.

References Cited by the Examiner

UNITED STATES PATENTS 2,736,514 2/1956 Ross.
2,939,649 6/1960 Shaw.
2,953,320 9/1960 Parry.
2,968,453 1/1961 Bright.

FOREIGN PATENTS 2,19,133 11/1958 Australia.

OTHER REFERENCES

Publication: "Symposium on Ground Effect Phenomena"; Oct. 21-23, 1959; pages 158 and 224 relied on.

A. HARRY LEVY, *Primary Examiner.*

PHILLIP ARNOLD, *Examiner.*